(12) United States Patent
Simmons et al.

(10) Patent No.: US 11,178,315 B2
(45) Date of Patent: Nov. 16, 2021

(54) SCOPE PHONE MOUNT

(71) Applicants: Val Simmons, Providence, UT (US); David Simmons, Hyrum, UT (US); Thayne Simmons, Providence, UT (US)

(72) Inventors: Val Simmons, Providence, UT (US); David Simmons, Hyrum, UT (US); Thayne Simmons, Providence, UT (US)

(*) Notice: Subject to any disclaimer, the term of this patent is extended or adjusted under 35 U.S.C. 154(b) by 23 days.

(21) Appl. No.: 15/233,714

(22) Filed: Aug. 10, 2016

(65) Prior Publication Data
US 2017/0142301 A1    May 18, 2017

Related U.S. Application Data

(60) Provisional application No. 62/203,224, filed on Aug. 10, 2015.

(51) Int. Cl.
| | |
|---|---|
| *H04N 5/225* | (2006.01) |
| *G02B 23/04* | (2006.01) |
| *F41C 27/00* | (2006.01) |
| *G03B 13/08* | (2021.01) |
| *G03B 17/56* | (2021.01) |
| *G02B 15/12* | (2006.01) |
| *F41J 5/10* | (2006.01) |

(Continued)

(52) U.S. Cl.
CPC ........... *H04N 5/2252* (2013.01); *F41C 27/00* (2013.01); *F41G 11/00* (2013.01); *F41J 5/10* (2013.01); *G02B 15/12* (2013.01); *G02B 23/04* (2013.01); *G03B 13/08* (2013.01); *G03B 17/561* (2013.01); *G03B 17/565* (2013.01); *H04N 5/2257* (2013.01); *H04N 7/185* (2013.01); *F41G 1/38* (2013.01); *G03B 29/00* (2013.01)

(58) Field of Classification Search
CPC ....... H04N 5/2252; H04N 7/185; F41G 11/00
USPC ......... 348/373; 396/429; 248/222.14; 42/79, 42/106, 124
See application file for complete search history.

(56) References Cited

U.S. PATENT DOCUMENTS

| | | |
|---|---|---|
| 3,545,356 A | 12/1970 | Nielsen |
| 4,290,219 A | 9/1981 | Boiler et al. |
| (Continued) | | |

FOREIGN PATENT DOCUMENTS

WO    2014/140303 A1    9/2014

OTHER PUBLICATIONS

PCT/US2016/046381, Notification of Transmittal of the International Search Report and the Written Opinion of the International Searching Authority, or the Declaration. dated Oct. 26, 2016.

*Primary Examiner* — Xi Wang
(74) *Attorney, Agent, or Firm* — Kunzler Bean & Adamson

(57) ABSTRACT

An apparatus is disclosed. The apparatus may include a housing detachably coupleable to an end of a sighting device. The housing may include a channel protruding from a side of the housing. The apparatus may include a one-way mirror disposed inside the housing. The one-way mirror may be positioned to allow an image from the sighting device to pass through the one-way mirror and reflect the image from the sighting device through the channel. The apparatus may include a mounting plate coupled to the housing. The mounting plate may include one or more adjustment bars that may be engageable with a visual recording device.

17 Claims, 8 Drawing Sheets

(51) Int. Cl.
  *F41G 11/00* (2006.01)
  *H04N 7/18* (2006.01)
  *F41G 1/38* (2006.01)
  *G03B 29/00* (2021.01)

(56) References Cited

U.S. PATENT DOCUMENTS

| | | | |
|---|---|---|---|
| 4,815,822 A | 3/1989 | Bramhall | |
| 5,020,262 A * | 6/1991 | Pena | G03B 29/00 |
| | | | 396/432 |
| 6,192,614 B1 * | 2/2001 | Cliburn | F41C 27/00 |
| | | | 42/106 |
| 6,357,884 B1 | 3/2002 | Lonergan | |
| 7,194,204 B2 | 3/2007 | Gordon | |
| 7,640,691 B2 | 1/2010 | Karcher et al. | |
| 8,727,643 B2 | 5/2014 | Mcleod | |
| 9,163,902 B1 * | 10/2015 | Cheng | F41G 1/30 |
| 10,054,397 B1 * | 8/2018 | Reimer | F41G 1/38 |
| 2002/0002788 A1 * | 1/2002 | Hope | F41C 27/00 |
| | | | 42/106 |
| 2002/0061767 A1 | 5/2002 | Sladen et al. | |
| 2002/0114070 A1 | 8/2002 | Barziza | |
| 2002/0163588 A1 * | 11/2002 | Holmberg | A01M 31/00 |
| | | | 348/373 |
| 2005/0132631 A1 | 6/2005 | Bodo | |
| 2005/0246910 A1 * | 11/2005 | Mowers | F41G 1/467 |
| | | | 33/266 |
| 2006/0038141 A1 * | 2/2006 | Blume | A61B 6/14 |
| | | | 250/559.02 |
| 2007/0189763 A1 | 8/2007 | Kojima et al. | |
| 2008/0104875 A1 | 5/2008 | Mayerle | |
| 2008/0164392 A1 * | 7/2008 | Holmberg | F41G 11/003 |
| | | | 248/230.7 |
| 2009/0255163 A1 * | 10/2009 | Holmberg | F41G 11/003 |
| | | | 42/124 |
| 2010/0119221 A1 * | 5/2010 | Lundberg | H04N 5/2254 |
| | | | 396/427 |
| 2011/0069220 A1 * | 3/2011 | Field | H04N 5/2171 |
| | | | 348/373 |
| 2012/0167441 A1 * | 7/2012 | Holmberg | F41B 5/1492 |
| | | | 42/119 |
| 2012/0174375 A1 | 7/2012 | McLeod | |
| 2014/0317987 A1 * | 10/2014 | Kuehl | G03B 29/00 |
| | | | 42/90 |
| 2015/0042873 A1 | 2/2015 | Hunt | |

* cited by examiner

SCOPE PHONE MOUNT

CROSS-REFERENCES TO RELATED APPLICATIONS

This application claims the benefit of U.S. Provisional Patent Application No. 62/203,224 entitled "Scope Phone Mount" and filed on Aug. 10, 2015 for Val Simmons, which is incorporated herein by reference.

FIELD

This invention relates to sighting devices and more particularly relates to a phone mount for a scope.

BACKGROUND

People are increasingly using their cellular phones to take pictures and videos. People using scopes, such as scopes mounted to a gun, binoculars, a telescope, or the like, may want to take pictures or video of what they see while using these scopes. Unfortunately, simultaneously aligning the phone's camera lens with the scope and using the scope to see a target may be difficult.

SUMMARY

An apparatus is disclosed. The apparatus may include a housing detachably coupleable to an end of a sighting device. The housing may include a channel protruding from a side of the housing. The apparatus may include a one-way mirror disposed inside the housing. The one-way mirror may be positioned to allow an image from the sighting device to pass through the one-way mirror and reflect the image from the sighting device through the channel. The apparatus may include a mounting plate coupled to the housing. The mounting plate may include one or more adjustment bars engageable with a visual recording device.

In one embodiment, the housing may include a clamp detachably coupleable to the end of the sighting device. The housing may include one or more tracks slidably engageable with a portion of the clamp. The housing may slide along the one or more tracks to adjust a distance from the sighting device.

In one embodiment, the mounting plate may include an image stabilizing bar. The image stabilizing bar may include a hook that may detachably engage with the sighting device and rotatably couple to the mounting plate.

In one embodiment, the apparatus may include a sunshade coupled to the mounting plate. In some embodiments, the sunshade may include a mirror mounted to a surface of the sunshade. The surface may be disposed toward a screen of the visual recording device.

In one embodiment, the one or more adjustment bars may move along an axis in X or Y relative to the mounting plate. In some embodiments, the one or more adjustment bars may include four adjustment bars. In one embodiment, one or more of the adjustment bars may include a rotatable stop. The rotatable stop may be located distal from the mounting plate. The rotatable stop may rotate to allow the visual recording device to disengage from the mounting device.

In one embodiment, the one or more adjustment bars may include a micro adjusting screw. The micro adjusting screw may adjust the position of the at least one adjustment bar in an axis of X or Y. In some embodiments, the one-way mirror may be disposed inside the housing at a 45 degree angle from an end of the housing. In one embodiment, the one or more adjustment bars may adjust to fit the visual recording device next to the mounting plate and align a camera lens of the visual recording device with the channel.

A system is disclosed. In one embodiment, the system may include a sighting device. In one embodiment, the system may include an apparatus. The apparatus may include a housing detachably coupleable to an end of a sighting device. The housing may include a channel protruding from a side of the housing. In one embodiment, the apparatus may include a one-way mirror disposed inside the housing. The one-way mirror may be positioned to allow an image from the sighting device to pass through the one-way mirror and reflect the image from the sighting device through the channel. In some embodiments, the apparatus may include a mounting plate coupled to the housing. The mounting plate may include one or more adjustment bars engageable with a visual recording device.

In one embodiment, the visual recording device may include a phone; a photography camera, a video camera, or an action camera. In some embodiments, the housing may include a clamp detachably coupleable to the end of the sighting device. The housing may include one or more tracks slidably engageable with a portion of the clamp. The housing may slide along the one or more tracks to adjust a distance from the sighting device.

In some embodiments, the mounting plate may include an image stabilizing bar. The image stabilizing bar may include a hook that may be detachably engageable with the sighting device and rotatably couple to the mounting plate. In one embodiment, the apparatus may include a sunshade coupled to the mounting plate. In one embodiment, the one or more adjustment bars may moves along an axis in X or Y relative to the mounting plate.

A method is disclosed. In one embodiment, the method may include providing a sighting device. In one embodiment, the method may include providing an apparatus that may include a housing, a one-way mirror disposed inside the housing, and a mounting plate. The housing may include a channel and the one-way mirror may allow an image viewed by the sighting device to pass through the one-way mirror and reflect the image from the sighting device through the channel. In some embodiments, the method may include mounting the housing of the apparatus to the sighting device. In one embodiment, the method may include providing a visual recording device. In one embodiment, the method may include mounting the visual recording device to the mounting plate. In some embodiments, the method may include aligning a lens of the visual recording device with the channel of the housing.

In one embodiment, the mounting plate may include one or more adjustment bars. Aligning the lens of the visual recording device with the channel of the housing may include adjusting at least one adjustment bar of the mounting plate in relation to the mounting plate.

In some embodiments, the apparatus may include an image stabilizing bar rotatably coupled to the mounting plate. The image stabilizing bar may include a hook. In one embodiment, mounting the apparatus to the sighting device may include detachably coupling the hook of the image stabilizing bar to the sighting device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. In the following description, numerous specific details are provided, such as examples of mechanical structures, electrical devices, hardware modules, hardware circuits, hardware chips, etc., to provide a thorough understanding of embodiments of the invention. Certain embodiments of the present disclosure may be provided as one or more methods. The methods may include providing one or more components of the apparatuses or systems. The methods may include using one or more components of the apparatuses or systems. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
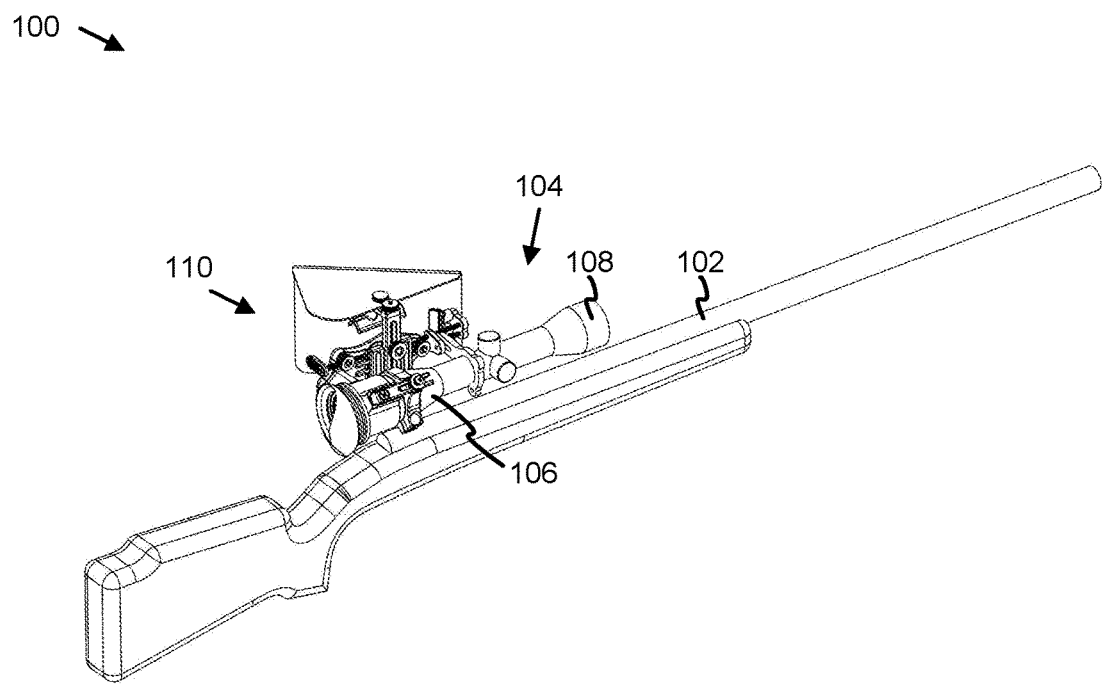
FIG. 1 is a perspective view illustrating one embodiment of a system for a phone scope mount.

FIG. 1 is a perspective view depicting one embodiment of a system 100 for a phone mount for a scope. The system 100 may include a weapon 102. Although the weapon 102 depicted in FIG. 1 is a rifle, it should not be understood that the weapon 102 is limited to a rifle. The weapon 102 may include a gun, a bow, a crossbow, or the like.

In one embodiment, the system 100 may include a sighting device 104. Although the sighting device 104 depicted in FIG. 1 is a gun scope, it should not be understood that the sighting device 104 is limited to a gun scope. The sighting device 104 may include one or more eyepieces and/or barrels of binoculars, a telescope, a camera lens, or another magnification or sighting device. In one embodiment, the sighting device 104 may include a first end 106. In a further embodiment, the first end 106 may include an aperture that a user looks through to use the sighting device 104. In one embodiment, the first end 106 may include a channel that connects the first end 106 to a second end 108 of the sighting device 104 or another part of the sighting device 104.

In one embodiment, the sighting device 104 may also include a second end 108. The second end 108 may include an aperture that faces a target and receives the image of the target. In a further embodiment, the second end 108 may include a channel that connects the second end 108 to the first end 106 of the sighting device 104 or to another part of the sighting device 104.

In one embodiment, the system 100 may include a phone scope mount 110. In a further embodiment, the phone scope mount 110 may include an apparatus that mounts to the sighting device 104. Although the phone scope mount 110 may mount to the first end 106 of the sighting device 104, as depicted in FIG. 1, it should not be understood that the phone scope mount 110 is limited to mounting to the first end 106 of the sighting device 104. The phone scope mount 110 may mount to the first end 106 of the sighting device 104, the second end 108, or another area of the sighting device 104.

In one embodiment, the phone scope mount 110 may mount visual recording device to the side of the sighting device 104. In some embodiments, the visual recording device may include a phone. In a further embodiment, the phone scope mount 110 may not be limited to mounting a phone to the side of the sighting device 104. A visual recording device may include a phone, a photography camera, a video recording camera, a web camera, an action camera, or another type of device capable of receiving optical input.

In certain embodiments, the phone scope mount 110 may be disposed to the side of the sighting device 104, above the sighting device 104, below the sighting device, or the like. For example, in one embodiment, the sighting device 104 may include a gun scope. The gun scope may mount to the weapon 102. The weapon 102 may include a gun. The gun may include one or more accessories mounted to the gun near the gun scope. The phone scope mount 110 may need to be disposed above the gun scope to avoid the accessories.

Figure 2A:
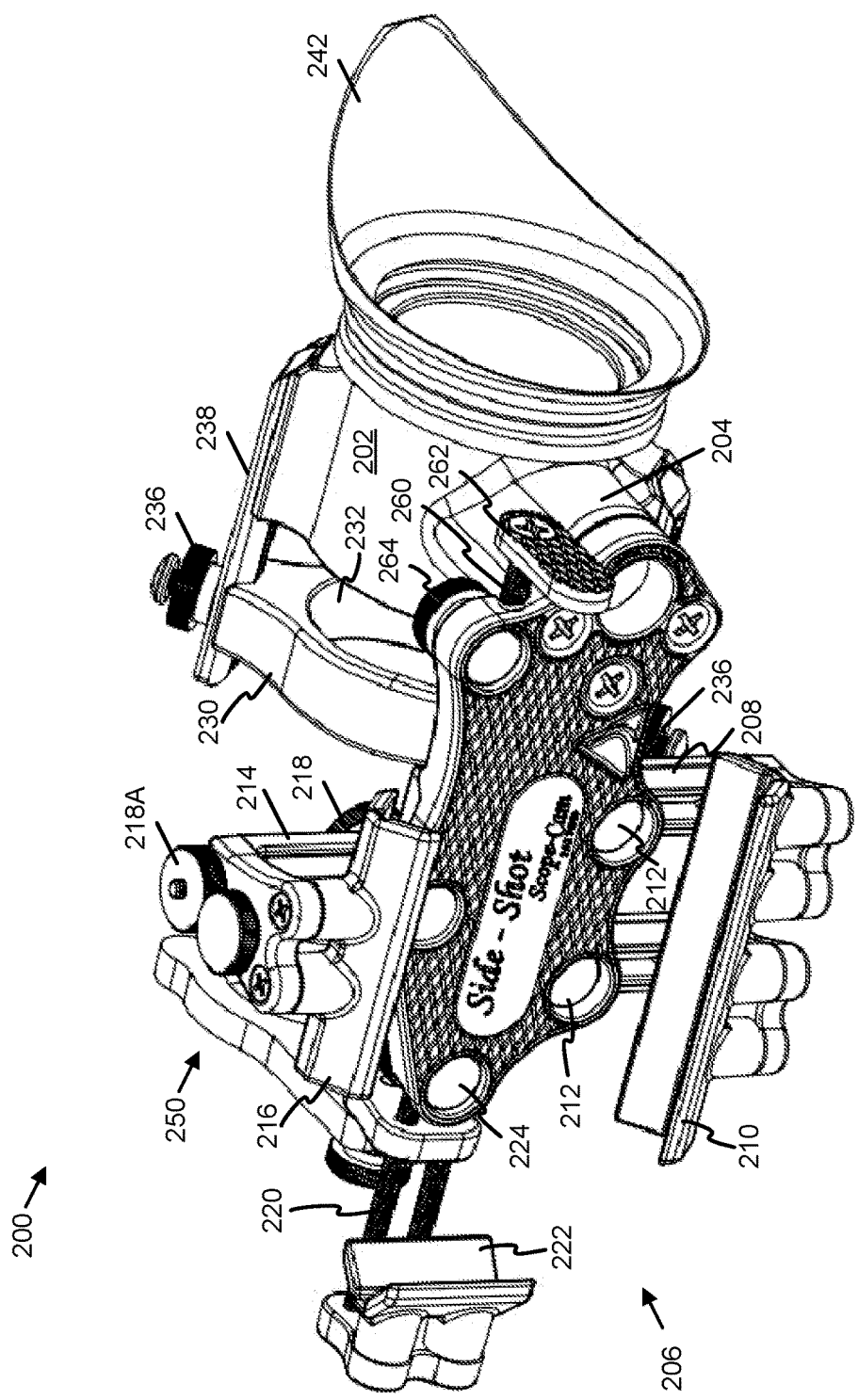
FIG. 2A is a perspective view illustrating one embodiment of an apparatus for a phone scope mount.
Figure 2B:
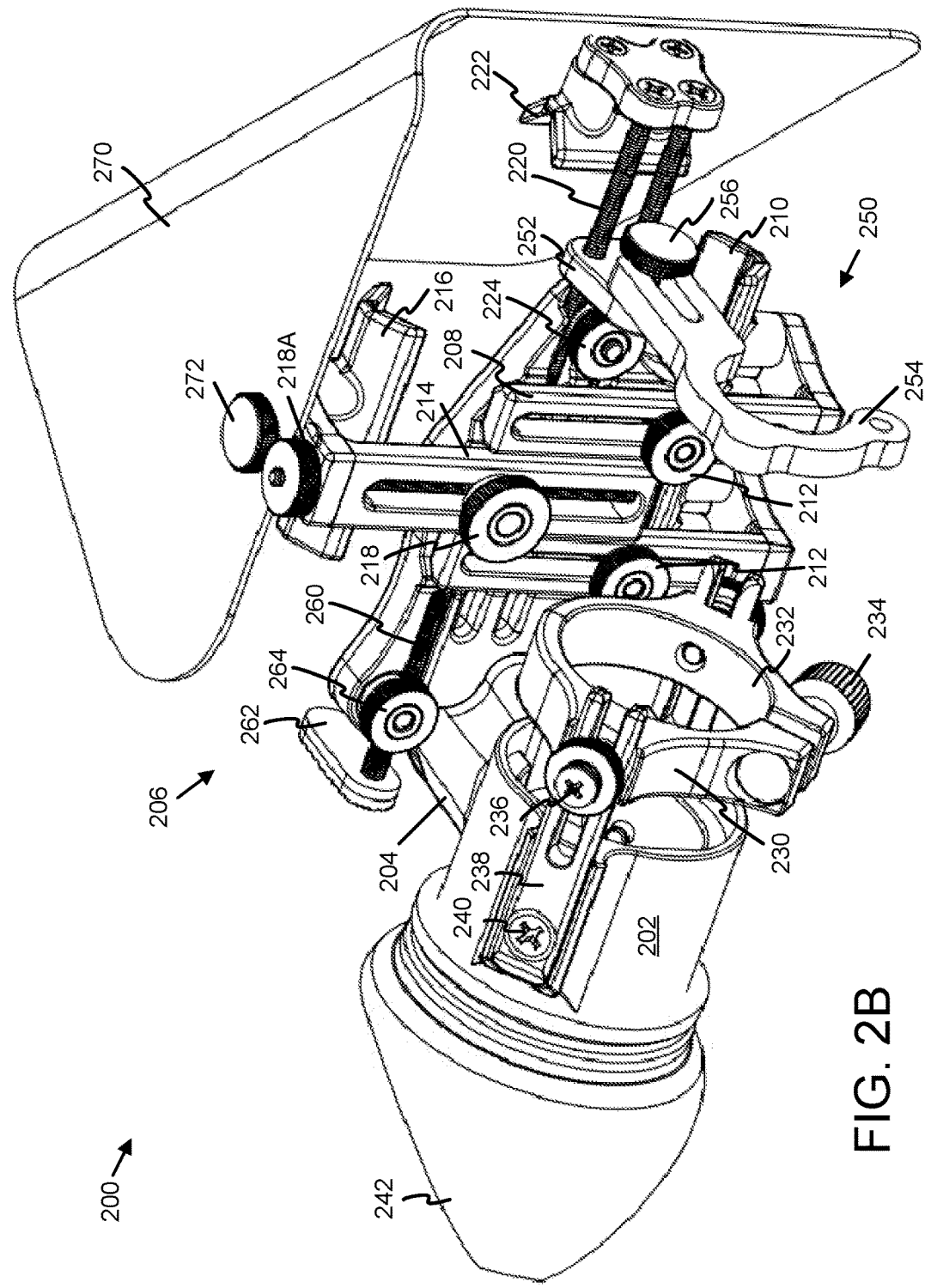
FIG. 2B is a perspective view illustrating another embodiment of an apparatus for a phone scope mount.

FIGS. 2A and 2B are perspective views depicting embodiments of an apparatus 200 for a phone scope mount. In one embodiment, the apparatus 200 may include a housing 202 mountable to the first end 106 of the sighting device 104. In a further embodiment, the housing 202 may include a channel that mounts to the first end 106 of the sighting device 104. In one embodiment, the housing 202 may include a first end that faces a user and a second end that mounts to the first end 106 of the sighting device 104. In one embodiment, the first end of the housing 202 may include eyepiece that faces the user and allows the user to look through the housing 202, the first end 106 of the sighting device 104, and the second end 108 toward a target.

In one embodiment, the apparatus 200 may include a channel 204 protruding from a side of the housing 202.

Although FIGS. 2A and 2B depict the channel 204 as protruding from the left side of the housing 202, it should not be understood that the channel 204 is limited to protruding from the left side of the housing 202. The channel 204 may protrude from a side of the housing 202 in a variety of ways. For example, in some embodiments, the channel 204 may protrude from the right side of the housing 202, the left side of the housing 202, the top of the housing 202, the bottom of the housing 202, or another side of the housing 202. Furthermore, in one embodiment, the channel 204 may include a channel of a width or diameter sufficient to allow a camera lens of a phone to receive an image from the housing 202.

In one embodiment, the channel 204 may include an adjustable length. The length of the channel 204 may adjust in a variety of ways. For example, in one embodiment, the channel 204 may include one or more channel spacers. In a further embodiment, the one or more channel spacers may include one or more additional channels that may connect to an end of the channel 204 and lengthen the channel 204. In another embodiment, the channel 204 may include a collapsible extender. In one embodiment, the collapsible extender may include one or more channels that may house inside the channel 204. In a further embodiment, the one or more channels of the collapsible channels may exit the channel 204 and lengthen the channel 204. The adjustable length may allow a user to couple the apparatus 200 to a sighting device 104 and avoid one or more protrusions on or near the sighting device 104 (such as the one or more gun accessories described above). One of skill in the art will recognize other ways that the channel 204 may include an adjustable length.

In one embodiment, the channel 204 may include an adjustable length to allow different cameras to focus on a desired object. A channel 204 of a fixed length may not allow a camera to focus on a desired object. For example, in one embodiment, the desired object that a camera should focus on may include a one-way mirror disposed inside the housing 202 (described in described below). In one embodiment, for example, the length from the end of the channel 204 to the one-way mirror may be 2 inches (approximately 5 cm). However, a user's visual recording device may not be able to focus on an object 2 inches away. A channel 204 that includes an adjustable length may lengthen to a length sufficient to allow a visual recording device to focus on the one-way mirror.

In one embodiment, the channel 204 may include an adjustable width. The width of the channel 204 may adjust in a variety of ways. For example, in one embodiment, the apparatus 200 may include multiple channels 204, each channel 204 having a different width. In a further embodiment, the multiple channels 204 may attach to and detach from the housing 202 or the mounting plate 206 (discussed below). In another embodiment, the channel 204 may include one or more rings that may fit over an end of the channel 204 and reduce the width of the opening of the end of the channel 204. For example, in one embodiment, the channel 204 may include one or more rings that fit over an end of the channel 204, each ring reducing the width of the end of the channel 204 by a different amount. In another embodiment, for example, a first ring of the one or more rings may fit over the end of the channel 204 and the other rings may fit inside the first ring. In a further embodiment, the channel 204 may include an aperture. In one embodiment, a user may adjust the aperture (for example, by twisting an end of the channel 204) to reduce or enlarge the width of an end of the channel 204. One of skill in the art will recognize other ways that the channel 204 may include an adjustable width.

In one embodiment, the channel 204 may include an adjustable width to allow different camera lens to look through the channel 204. For example, in one embodiment, a user may mount a phone to the apparatus 200. In a further embodiment, the phone's camera lens may have a width of 0.5 inches (approximately 1.3 cm). The channel 204 may adjust its width to approximately 0.5 inches. Later, the user may dismount the phone and mount a camera to the apparatus 200. The camera's lens may have a width of 3 inches (approximately 7.6 cm). The user may adjust the width of the channel 204 to approximately 3 inches to accommodate the width of the camera's lens. Additionally or alternatively, in one embodiment, the user may adjust the width of the channel 204 to a size larger or smaller than the width of the lens that looks through the channel 204.

In one embodiment, the apparatus 200 may include a mounting plate 206. The mounting plate 206 may be disposed to a side of the sighting device 104. In one embodiment, the mounting plate 206 may mount to a side of the housing 202. For example, the mounting plate 206 may couple to the channel 204. The mounting plate 206 may couple to another portion of the housing. In one embodiment, the mounting plate 206 may couple to the sighting device 104. In one embodiment, the mounting plate 206 may include one or more adjustment bars adjustable along one or more axes in X or Y in relation to the surface of the mounting plate 206. In a further embodiment, the adjustment bars may adjust for a size or a placement of a lens of a visual recording device.

In one embodiment, the mounting plate 206 may include a substantially flat surface. A surface of a visual recording device may engage with the substantially flat surface and the flat surface may assist in preventing the visual recording device from moving around or slipping. The surface may include groove pattern. The groove pattern may include one or more grooves disposed on the flat surface to prevent an object engaged with the surface from slipping. In one embodiment, the surface may include a place for a logo, decal, or the like. In one embodiment, the mounting plate 206 may include a variety of shapes. The type, size, or shape of sighting device 104 or visual recording device may influence the shape of the mounting plate 206.

In one embodiment, the apparatus 200 may include a lower adjustment bar 208. The lower adjustment bar 208 may include one or more bars that include a groove running through a central portion of the bar. The lower adjustment bar 208 may connect to a lower adjustment stop 210. The lower adjustment bar 208, in some embodiments, may connect to the mounting plate 206 through a lower adjustment connector 212. The lower adjustment connector 212 may couple the lower adjustment bar 208 to the mounting plate 206. In one embodiment, the lower adjustment bar 208 may vertically adjust in relation to the mounting plate 206. In one embodiment, as depicted in FIGS. 2A and 2B, the mounting plate 206 may include two lower adjustment bars 208 that couple to one lower adjustment stop 210.

In one embodiment, the lower adjustment bar 208 may include the lower adjustment stop 210. In a further embodiment, the lower adjustment stop 210 may protrude away from the lower adjustment bar 208 at an angle. For example, in one embodiment, the lower adjustment stop 210 may include a piece with one or more lips or grooves. In some embodiments, the one or more lips or grooves may face up (toward the mounting plate 206) and receive a visual recording device and hold the visual recording device to the mounting plate 206, preventing the visual recording device from moving in relation to the mounting plate 206.

In one embodiment, the lower adjustment connector 212 may couple the lower adjustment bar 208 to the mounting plate 206. The lower adjustment connector 212, in one embodiment, may partially disengage from the lower adjustment bar 208 to allow the lower adjustment bar 208 to move up or down in relation to the mounting plate 206. In one embodiment, the lower adjustment connector 212 may include a screw and a nut. The screw may penetrate an aperture in the mounting plate 206 and extend toward the backside of the mounting plate 206. The backside of the mounting plate 206 may include the side of the mounting plate 206 that faces the sighting device 104. The screw may include a head sized and shaped to prevent the screw from completely penetrating the mounting plate 206. The screw may penetrate the groove disposed in the central portion of the lower adjustment bar 208 and the nut may couple to the screw and engage with the lower adjustment bar 208. The nut engaging with the lower adjustment bar 208 may hold the lower adjustment bar 208 in place in relation to the mounting plate. The nut may include a patterned edge to assist a user in gripping the nut. The lower adjustment connector 212 may include a washer disposed between the mounting plate 206 and the nut. The washer may help couple the lower adjust bar 208 to the nut. In a further embodiment, the lower adjustment bar 208 and lower adjustment stop 210 may adjust for different shapes or sizes of visual recording devices and different locations of lenses on visual recording devices by moving up and down in relation to the mounting plate 206.

In one embodiment, the apparatus 200 may include an upper adjustment bar 214. The upper adjustment bar 214, in a further embodiment, may connect to an upper adjustment stop 216. In one embodiment, the upper adjustment bar 214 may connect to the mounting plate 206 through an upper adjustment connector 218. In a further embodiment, the upper adjustment bar 214 may vertically adjust in relation to the mounting plate 206.

In one embodiment, the upper adjustment bar 214 may include the upper adjustment stop 216. In a further embodiment, the upper adjustment stop 216 may protrude away from the upper adjustment bar 214 at an angle. For example, in one embodiment, the upper adjustment stop 216 may include a piece with one or more lips or grooves. In a further embodiment, the one or more lips or grooves may face down (toward the mounting plate 206) and receive a visual recording device, holding the visual recording device to the mounting plate 206 and preventing the visual recording device from moving in relation to the mounting plate 206. In one embodiment, the upper adjustment connector 218 may mount the upper adjustment bar 214 to the mounting plate 206. The upper adjustment connector 218, in some embodiments, may partially disengage from the upper adjustment bar 214 to allow the upper adjustment bar 214 to move up or down in relation to the mounting plate 206. In a further embodiment, the upper adjustment bar 214 and upper adjustment stop 216 may adjust for different sizes or shapes of visual recording devices and different locations of a lenses on the visual recording devices by moving up and down in relation to the mounting plate 206. The upper adjustment connector may include a screw and nut assembly as described above.

In one embodiment, the upper adjustment bar 214 may include a micro adjuster 218A. The micro adjuster 218A may include a screw that penetrates downward through the upper adjustment bar 208 or the mounting plate 206. For example, the upper adjustment connector 218 may include a screw with a threaded aperture inside the shaft of the screw. The screw of the micro adjuster 218A may penetrate the threaded aperture. The micro adjuster 218A may include a turning cap disposed on an upper portion of the upper adjustment bar 214. Turning the turning cap may cause the screw to turn, which may adjust the upper adjustment bar 214 in a vertical movement. Although FIG. 2A depicts only the upper adjustment bar 214 as including a micro adjuster 218A, the lower adjustment bar 208, a horizontal adjustment bar 220, or the secondary horizontal bar 260 may include a micro adjuster 218A.

In one embodiment, the apparatus 200 may include a horizontal adjustment bar 220. In some embodiments, the horizontal adjustment bar 220 may connect to a horizontal adjustment stop 222. In a further embodiment, the horizontal adjustment bar 220 may connect to the mounting plate 206 through a horizontal adjustment connector 224. The horizontal adjustment bar 220, in one embodiment, may adjust horizontally in relation to the mounting plate 206. In a further embodiment, the horizontal adjustment bar 220 may include the horizontal adjustment stop 222. The horizontal adjustment stop 222, in some embodiments, may protrude away from the horizontal adjustment bar 220 at an angle. For example, in one embodiment, the horizontal adjustment stop 222 may include a piece with one or more lips or grooves. In a further embodiment, the one or more lips or grooves may face toward the mounting plate 206 and receive a visual recording device, holding the visual recording device to the mounting plate 206, and preventing the visual recording device from moving in relation to the mounting plate 206. In one embodiment, the horizontal adjustment connector 224 may mount the horizontal adjustment bar 220 to the mounting plate 206. In a further embodiment, the horizontal adjustment connector 224 may partially disengage from the horizontal adjustment bar 220 to allow the horizontal adjustment bar 220 to move side to side in relation to the mounting plate 206. In one embodiment, the horizontal adjustment bar 220 and horizontal adjustment stop 222 may adjust for different shapes or sizes of visual recording devices and different locations of lenses on visual recording devices by moving up and down in relation to the mounting plate 206. The horizontal adjustment connector 224 may include a screw and nut assembly as described above.

In one embodiment, the horizontal adjustment bar 220 may include one or more screws. For example, as depicted in FIGS. 2A and 2B, the horizontal adjustment bar 220 may include two screws. Multiple screws may provide added stability to the sighting device 104. The added stability may include stability in response to recoil from the sighting device 104. For example, the sighting device 104 may include a gun scope mounted to a gun and shooting the gun may cause recoil.

In another embodiment, the apparatus 200 may include a second horizontal adjustment bar. In one embodiment, the second horizontal adjustment bar may connect to a second horizontal stop. In a further embodiment, the second horizontal stop may include one or more lips or grooves that face toward the mounting plate 206. The second horizontal bar, in some embodiments, may connect to the mounting plate 206 through a second horizontal connector. In one embodiment, the second horizontal bar may move side to side in relation to the mounting plate 206 to adjust for different sizes or shapes of visual recording devices and different locations of lenses on visual recording devices. In one embodiment, the second horizontal bar may include the secondary horizontal bar 260 described below.

In one embodiment, the lower adjustment bar 208, the upper adjustment bar 214, and the horizontal adjustment bar 220 (collectively, "the adjustment bars") may each include a stop extender. Each stop extender, in one embodiment, may extend a connected adjustment bar 208, 214, 220 away from the mounting plate 206 at an angle substantially perpendicular to the connected adjustment bar 208, 214, 220. For example, in one embodiment, each stop extender may extend a connected adjustment bar 208, 214, 220 away from the central adjust mount 206 and away from the housing 202 at a perpendicular angle to the connected adjustment bar 208, 214, 220. In a further embodiment, the stop extenders may allow visual recording devices of different sizes or shapes to mount to the size of the housing 202.

In one embodiment, the lower, upper, and horizontal adjustment stops 210, 216, and 222 (collectively, "the adjustment stops") may detach from the adjustment bars 208, 214, 220. In a further embodiment, the adjustment stops 210, 216, 222, may detach from the adjustment bars 208, 214, 220 to allow different adjustment stops 210, 216, 222 to attach to the adjustment bars 208, 214, 220. In some embodiments, the various adjustment stops 210, 216, 222 may include adjustment stops 210, 216, 222 of different shapes and sizes. For example, in one embodiment, one lower adjustment stop 210 may include a rounded groove and another lower adjustment stop 210 may include an angular groove. In another embodiment, the adjustment stops 210, 216, 222 may include stops that change shape. One of skill in the art will recognize other forms the adjustment stops 210, 216, 222 may include to engage and hold different devices to the side of the sighting device 104.

In one embodiment, the apparatus 200 may include one or more levels mounted to the housing 202 or to the mounting plate 206. In a further embodiment, the one or more levels may assist a user in mounting the cases 202 to the first end 106 of the sighting device 104 in a desired orientation. For example, in one embodiment, the one or more levels may assist the user in orienting the housing 202 such that channel 204 extends horizontally from the housing 202 as depicted in FIGS. 2A and 2B. In another embodiment, the one or more levels may assist a user in orienting the housing 202 such that the channel 204 extends vertically from the housing 202. One of skill in the art will recognize other ways that the one or more levels may assist a user in orienting the housing 202 into a desired position on the first end 106 of the sighting device 104.

In one embodiment, the apparatus 200 may include a clamp 230. The clamp 230 may mount to the sighting device 104. For example, the clamp 230 may include an adjustable ring that may adjust in diameter to adapt to a size of a sighting device 104. The clamp 230 may include one or more sizing rings 232. A sizing ring 232 may be disposed on an interior surface of the clamp 230. A sizing ring 232 may include one or more apertures to allow a fastener 236 to penetrate the aperture and hold the sizing ring 232 in place.

In one embodiment, the clamp 230 may include a clamp fastener 234. The clamp fastener 234 may penetrate an aperture disposed on the clamp 230. Tightening the clamp fastener 234 may reduce the diameter of the clamp 230 and cause the clamp 230 to grip to the sighting device 104.

In one embodiment, the clamp 230 may include one or more fasteners 236. A fastener 236 may penetrate an aperture disposed on an edge of the clamp 230. The fastener 236 may include a washer disposed around a shaft of the fastener 236. As described above, the fastener may penetrate an aperture of a sizing ring 232 disposed on the interior surface of the clamp 230.

In one embodiment, the housing 202 may include one or more sliding tracks 238. A sliding track 238 may include a longitudinal piece of material disposed on an exterior surface of the housing 202. The piece of material may include a groove that travels a portion of the length of the sliding track 238. The groove may include an open end disposed away from housing 202. The sliding track 238 may couple to the housing 202 via a fastener 240. In one embodiment, the groove of the sliding track 238 may be sized to fit around the shaft of the fastener 236. The clamp 230 may slide into the sliding track 238 via the one or more fasteners 236. The washer of the fastener 236 may engage with the sliding track 238 and may couple the housing 202 to the clamp 230. In one embodiment, one or more sliding tracks 238 may be disposed on the clamp 230 and one or more fasteners 236 may be disposed on the housing 202.

In one embodiment, the housing 202 sliding in and out of the sliding track 238 may allow a user to quickly remove one or more portions of the apparatus 200, such as the housing 202 and the mounting plate 206 with the attached adjustment bars 208, 214, 220, from the sighting device 104. The housing 202 sliding in and out of the sliding track 238 may allow the user to adjust the distance between the housing 202 and the sighting device. Adjusting the distance may include adjusting the focus of the housing or a visual recording device, such as a phone, attached to the apparatus 200.

As depicted in FIGS. 2A and 2B, in one embodiment, the one or more sliding tracks 238 and fasteners 240 may be disposed on the housing 202 and the one or more fasteners 236 may be disposed on the clamp 230. In one embodiment, the one or more sliding tracks 238 and fasteners 240 may be disposed on the clamp 230 and the one or more fasteners 236 may be disposed on the housing 202.

In one embodiment, the housing 202 may include a sight shade 242. The sight shade 242 may include a piece of material that surrounds at least a portion of the viewing end of the housing 202. The sight shade 242 may prevent light from entering the interior of the housing 202 and may prevent glare or interference from interfering with the user's view. The sight shade 242 may block prevent light around the viewing end of the housing 202 to be reflected off the mirror disposed inside the housing 202 (discussed below) and enter the recording device mounted to the mounting plate 206.

In one embodiment, the apparatus 200 may include an image stabilizing bar 250. In one embodiment, the image stabilizing bar 250 may be disposed on the horizontal adjustment bar 220. In one embodiment, the image stabilizing bar 250 may be disposed on a portion of the mounting plate 206. The image stabilizing bar 250 may include a coupling bar 252. The coupling bar 252 may couple the image stabilizing bar 250 to the horizontal adjustment bar 220. The coupling bar 252 may include one or more apertures that the horizontal adjustment bar 220 may penetrate. The coupling bar 252 may include a length to extend the image stabilizing bar 250 toward the sighting device 104.

In one embodiment, the image stabilizing bar 250 may include a sight bar 254. The sight bar 254 may detachably couple to the sighting device 104. The sight bar 254 may engage with the sighting device 104 and may provide stability to the recording device disposed on the mounting place 206.

In one embodiment, as depicted in FIG. 2B, the sight bar 254 may include a hook. The hook may be sized or shaped to detachably couple to a portion of the sighting device 104. In one embodiment, the sight bar 254 may include a different coupling mechanism. For example, the sight bar 254 may include a clamp, a clasp, or the like. In one embodiment, the sight bar 254 may include a groove. The groove may be disposed on the sight bar 254 distal from the coupling mechanism. The groove may allow the user to adjust the length of the image stabilizing bar 250.

In some embodiments, the image stabilizing bar may include a fastener 256. The fastener 256 may couple the sight bar 254 with the coupling bar 252. In one embodiment, tightening the fastener 256 may fix the position of the sight bar 254 relative to the coupling bar 252. In some embodiments, loosening the fastener 256 on the sight bar 254 facilitates adjustment of the corresponding end of the mounting plate 206 radially relative to the sighting device 104. In some embodiments, the fastener 256, the sight bar 254, and the coupling bar 252 for an adjustment mechanism for adjusting the radial displacement of the mounting plate 206 relative to the sighting device 104. In some embodiments, the fastener 256 may include a connector similar to the connectors 212, 218, 224 described above.

In one embodiment, the mounting plate 206 may include a secondary adjustment bar 260. The secondary adjustment bar 260 may be disposed horizontally on the mounting plate 206 distal from the horizontal adjustment bar 220 as depicted in FIGS. 2A and 2B. The secondary adjustment bar 260 may include a screw. The secondary adjustment bar 260 may include a rotatable stop 262. The rotatable stop 262 may be disposed on the secondary adjustment bar 260 distal from the mounting plate 206. In one embodiment, the rotatable stop 262 may rotate around an axis. The rotatable stop 262 may rotate away from the housing 202 and may be disposed at a length away from the housing. In response to rotating away from the housing 202, the rotatable stop 262 may engage with an edge of a recording device, such as a phone, mounted to the mounting plate 206. The rotatable stop 262 may prevent the recording device from sliding away from the mounting plate 260. The user may rotate the rotatable stop 262 to quickly slide the visual recording device toward or away from the mounting plate 206.

In one embodiment, the apparatus 200 may include one or more adjustment bar grooves. The adjustment bar grooves may include one or more grooves that receive an adjustment bar 208, 214, 220, or 260. The one or more grooves may be disposed on the backside or front side of the mounting plate 206. An adjustment bar 208, 214, 220, 260 may fit within an adjustment bar groove and substantially fit within the mounting plate 206. In one embodiment, an adjustment bar groove may run along the entire width or length of the mounting plate 206 or may run part of the width or length of the mounting plate 206. In one embodiment, an adjustment bar groove may include a width substantially the same as a corresponding adjustment bar 208, 214, 220, 260. In a further embodiment, an adjustment bar groove may include a width wider than the width of the corresponding adjustment bar 208, 214, 220, 260. In one embodiment, a width wider than the corresponding adjustment bar 208, 214, 220, 260 may allow a user to adjust the corresponding adjustment bar 208, 214, 220, 260 side-to-side and allow the corresponding adjustment stop 210, 216, 222, 262 to engage with a larger selection of visual recording devices.

In one embodiment, the apparatus 200 may include a shade 270. The shade 270 may include a piece of material disposed around the visual recording device while the visual recording device is mounted to the mounting plate 206. The shade 270 may shade the visual recording device from a light source, such as the sun, so that the user may view a screen of the visual recording device. A light source may make viewing the screen difficult because of glare or the like on the screen. In one embodiment, a fastener 272 may fasten the shade 270 to the apparatus 200. For example, as depicted in FIG. 2B, the fastener 272 may be disposed on the upper adjustment bar 214.

Figure 3:
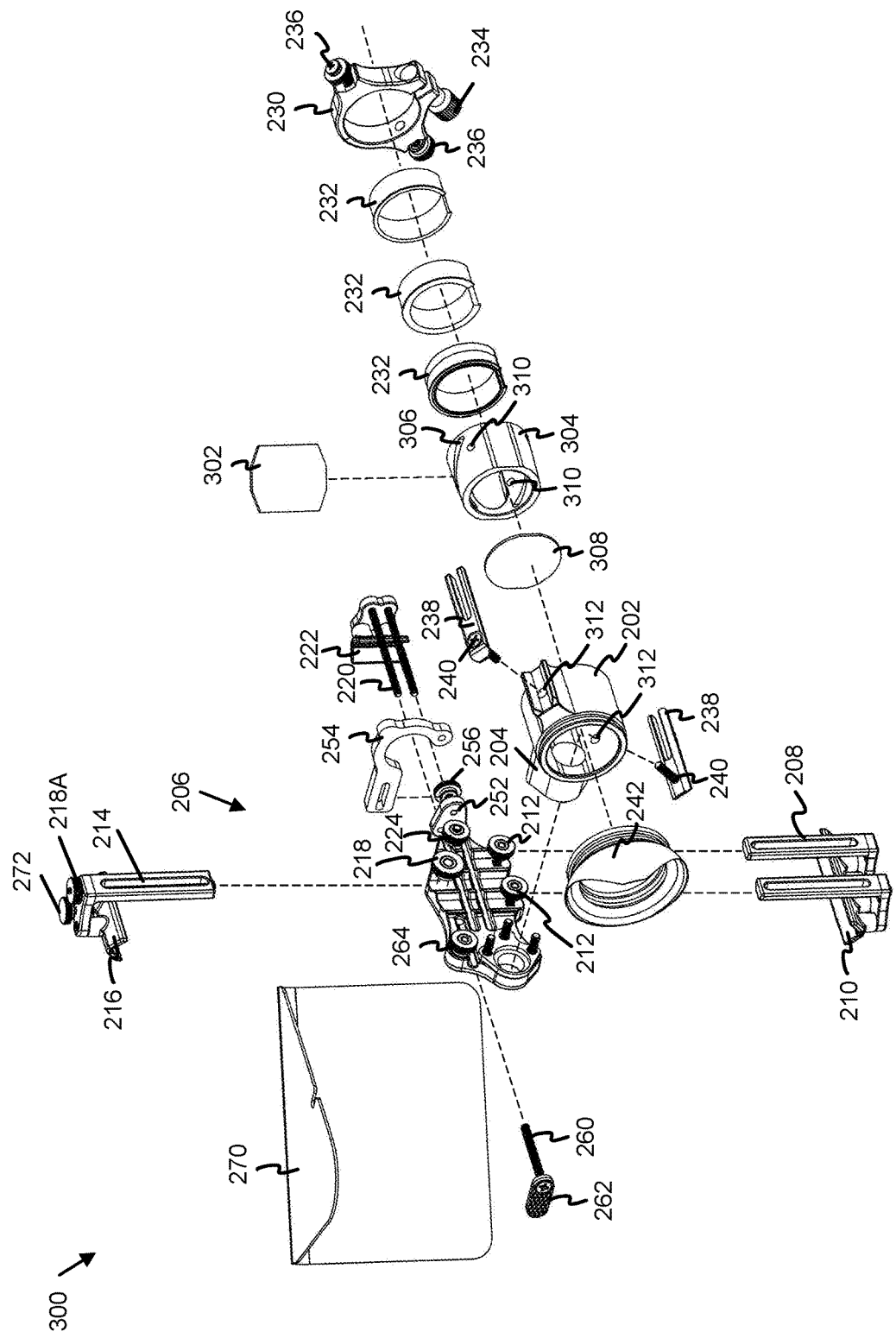
FIG. 3 is an exploded perspective view illustrating an embodiment of an apparatus for a phone scope mount.

FIG. 3 is an exploded view illustrating one embodiment of an apparatus 300 for a phone scope mount. In one embodiment, the apparatus 300 may include a housing 202 mountable to a first end 106 of a sighting device 104, a channel 204 coupled to a side of the housing 202, a mounting plate 206 mounted to a side of the housing 202, the adjustment bars 208, 214, 220, and 260, the adjustment stops 210, 216, 222, and 262, and lower, upper, and horizontal adjustment connectors 212, 218, 224, 264 (collectively, "the adjustment connectors"), as described in relation to FIGS. 2A-B.

The apparatus 300, in some embodiments, may include a one-way mirror 302. In one embodiment, the one-way mirror 302 may mount inside the housing 202 between a first end of the housing 202 and the second end 108 of a sighting device 104. In a further embodiment, the one-way mirror 302 may allow an image from the second end of the scope 108 to pass through the one-way mirror 302 toward the first end of the housing 202. In one embodiment, a user may look through the first end of the housing 202 and view the image that passes through the one-way mirror 302. In a further embodiment, the one-way mirror 302 may reflect the image from the second end 108 of the sighting device 104 through the channel 204. In one embodiment, the reflected image may pass through the channel 204 and into the lens of a visual recording device.

The one-way mirror 302 may include a piece of glass or other transparent material. The glass may be coated with a layer of reflective material. The layer may include a thin layer of aluminum. The coating may reflect a portion of the light of the image into the channel 204 and may allow a portion of the light of the image to pass through the coating to the user's eye. One of skill in the art may appreciate other embodiments of a one-way mirror.

The one-way mirror 302 may mount inside the housing 202 in a variety of ways. For example, in one embodiment, the housing 202 may include a housing insert 304. The housing insert 304 may be shaped or sized to insert inside the housing 202. The housing insert 304 may include one or more slots 306. The slots 306 may receive the one-way mirror 302 and hold it in place inside the housing 202 and housing insert 304. The housing insert 304 may include an aperture disposed in a side of the housing insert 304 that may align with the channel 204 of the housing 202. In some embodiments, the one-way mirror 302 may include a mirror shaped to fit inside the housing 202. In one embodiment, the one-way mirror 302 may mount inside the housing 202 and prevent a user from looking through the first end 106 of the sighting device 104 without looking through the one-way mirror 302. In another embodiment, the one-way mirror 302 may block part of the first end 106 of the sighting device 104 from direct view of the user and allow a user to see part of the first end 106 of the sighting device 104 without looking through the one-way mirror 302.

In one embodiment, the one-way mirror 302 may mount inside the housing 202 at an angle to the housing 202. For example, in one embodiment, the one-way mirror 302 may mount inside the housing 202 at a 45-degree angle from the side of the housing 202. In another embodiment, the one-way mirror 302 may mount at an acute or obtuse angle from the side of the housing 202. In one embodiment, the angle at which the one-way mirror 302 is disposed inside the housing 202 may determine the angle at which the channel 204 protrudes from the side of the housing 202. For example, in one embodiment, the one-way mirror 302 may mount inside the housing 202 at a 45-degree angle and the channel 204 may protrude perpendicularly from the side of the housing 202. In another embodiment, the one-way mirror 302 may mount inside the housing 202 at an acute angle to the side of the housing 202 and the channel 204 may protrude at an angle from the case such that the one-way mirror 302 reflects the image through the channel 204.

In some embodiments, the apparatus 300 may include a lens 308. The lens 308 may be disposed on an end of the housing insert 304. The lens 308 may be disposed at the end of the housing insert 304 that faces a user looking through the viewing end of the housing 202. The lens 308 may prevent dust, debris, or the like from entering the housing 202 and/or contacting the one-way mirror 302.

In one embodiment, the housing insert 304 may include one or more track fastener apertures 310. The housing 202 may include one or more track fastener apertures 312. The tracker fasteners 310 of the housing insert 304 and the track fasteners of the housing 202 may align in response to the housing insert 304 being in an inserted state inside the housing 202. The one or more fasteners 240 may be inserted into the track fastener apertures 310, 312. The track fastener apertures 310, 312 may include threaded apertures to receive the fasteners 240. In one embodiment, the fasteners 240 may hold the housing insert 304 inside the housing 202. Removing the fasteners 240 may allow a user to remove the housing insert 304 from the housing 202, which may allow the user to remove the on-way mirror 302 from the slot 306.

Figure 4A:
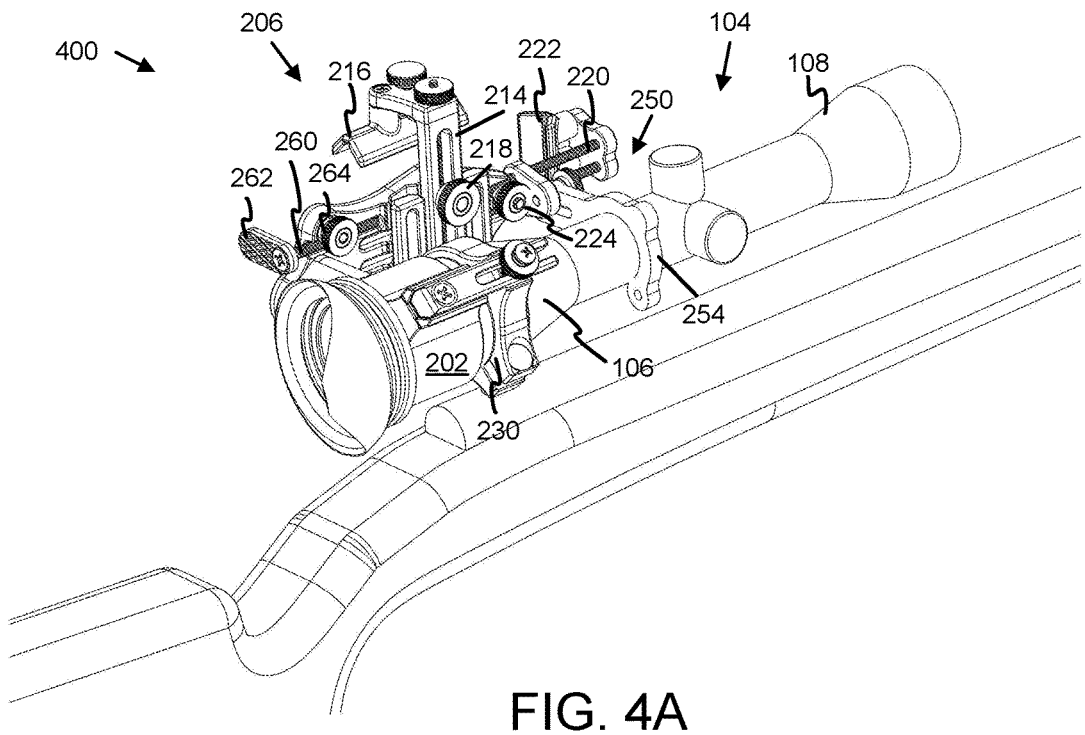
FIG. 4A is a perspective view illustrating one embodiment of a system for a phone scope mount.

FIG. 4A is a perspective view depicting one embodiment of a system 400 for a phone scope mount. In one embodiment, the system 400 may include a housing 202 mounted to a first end 106 of a sighting device 104 and a channel 204 mounted to a side of the housing 202. In a further embodiment, a mounting plate 206 may be mounted to the housing 202. The mounting plate 206, in some embodiments, may include the adjustment bars 208, 214, 220, 260, the adjustment stops 210, 216, 222, 262, and the adjustment connectors 212, 218, 224, 264 as described above in relation to FIGS. 2A and 2B and FIG. 3. The housing 202 may mount to the first end 106 of the sighting device 104 in variety of ways. For example, in one embodiment, the housing 202 may slide over the first end 106 of the sighting device 104. Additionally or alternatively, in one embodiment, the housing 202 may include a clamp 230 as described above in relation to FIGS. 2A and 2B and FIG. 3.

In a further embodiment, the clamp 230 may fasten the housing 202 to the first end 106 of the sighting device 104. With the housing 202 mounted to a first end 106 of a sighting device 104, in some embodiments, the system 400 may be in a position to receive and hold a visual recording device, as depicted in FIG. 4B.

Figure 4B:
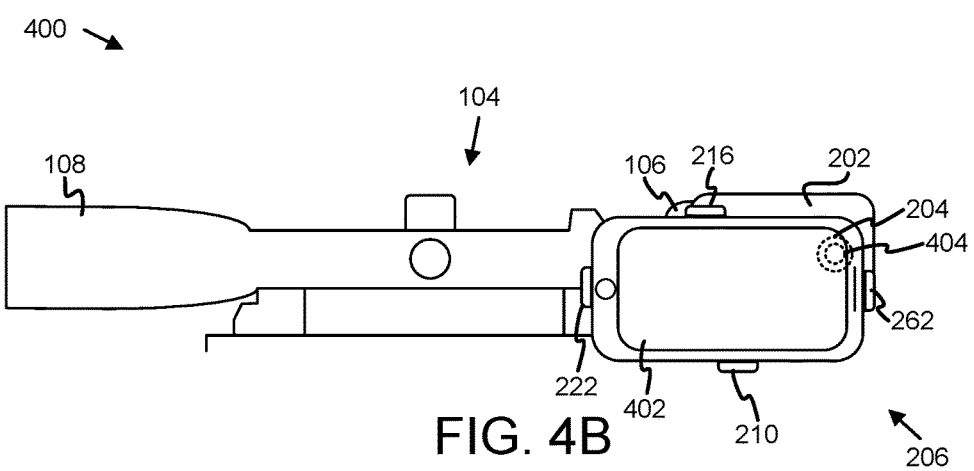
FIG. 4B is a side view illustrating another embodiment of a system for a phone scope mount.

FIG. 4B is side view depicting one embodiment of a system 400 for a phone scope mount. In one embodiment, the system 400 may include a housing 202 mounted to a first end 106 of a sighting device 104 and a channel 204 mounted to a side of the housing 202, as discussed above in relation to FIG. 4A. In one embodiment, a visual recording device 402 may selectively mount to the side of the housing 202 using the adjustment stops 210, 216, 222, 262. The visual recording device 402 may include one of several devices described above. As depicted in FIG. 4B, the visual recording device 402 may include a phone. The visual recording device 402 may include a lens 404. The lens 402 may be disposed on a surface of the visual recording device 402 disposed toward the channel 204. In a further embodiment, the adjustment stops 210, 216, 222, 262 may hold the visual recording device 402 close to the mounting plate 206 without the visual recording device 402 contacting the plate of the mounting plate 206. Many phones are protected by phone cases that surround the phone. In some embodiments, in response to the adjustment stops 210, 216, 222, and 262 holding the phone 402 close to the mounting plate 206 without the phone touching the plate of the mounting plate 206, a user may use the apparatus 400 without having to remove the phone's 402 phone case.

In another embodiment, the adjustment stops 210, 216, 222, 262 may mount a camera to the side of the housing 202 using the stop extenders of the adjustment bars 208, 214, 220, 260. In a further embodiment, the stop extenders may extend away from the housing 202 and the mounting plate 206 at an angle perpendicular to the adjustment bars 208, 214, 220, 260. In one embodiment, the stop extenders may adjust the adjustment stops 210, 126, 222, 262 to engage and hold the camera.

As depicted in FIG. 4B, a user may adjust the positions of the adjustment bars 208, 214, 220, 260 in the X or Y directions relative to the mounting plate 206. Adjusting the positions of the adjustment bars 208, 214, 220, 260 may align the lens of the visual recording device 402 with the channel 204. In the aligned position, the visual recording device 402 may be in a position to receive images from the sighting device 104 and recording the images.

Figure 5:
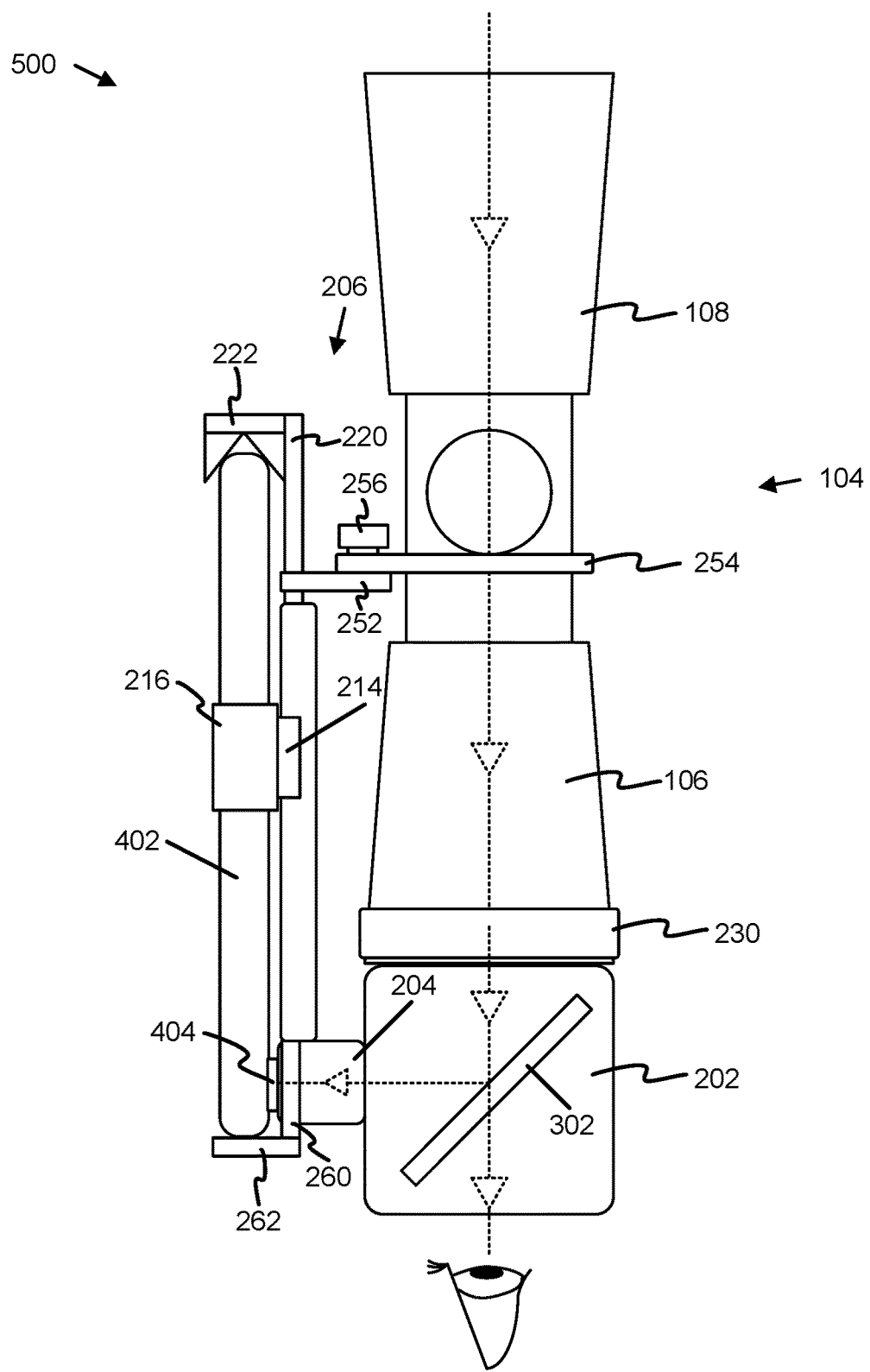
FIG. 5 is a cutaway top view illustrating an additional embodiment of a system for phone scope mount.

FIG. 5 is a cutaway top view depicting one embodiment of an apparatus 500 for a phone scope mount. In one embodiment, the apparatus 500 may include a housing 202, a clamp 230 mounting the housing 202 to a first end 106 of a sighting device 104, a channel 204, a mounting plate 206, the adjustment bars 208, 214, 220, 260 the adjustment stops 210, 216, 222, 262 and a one-way mirror 302 mounted inside the housing 202, as described above. In one embodiment, a visual recording device 402 may mount to the side of the mounting plate 206. The adjustment bars 208, 214, 220 and adjustment stops 210, 216, 222 may mount the visual recording device 402 to the side of the mounting plate 206. In a further embodiment, the visual recording device 402 may include a lens 404. The lens 404, in some embodiments, may be disposed on the surface of the visual recording device 402 disposed toward the channel 204. In one embodiment, the adjustment bars 208, 214, 220, 260 may adjust vertically and horizontally as described above in FIGS. 2A, 2B, 3, and 4 to align the camera lens 404 with the channel 204, as depicted in FIG. 5.

In one embodiment, a user may look through a first end of the housing 202. In a further embodiment, the one-way mirror 302 may mount inside the housing 202 between a first end of the housing 202 and the second end 108 of a sighting device 104. As depicted in FIG. 5, the dotted lines may represent the image received through the sighting device 104. In one embodiment, the one-way mirror 302 may allow the user to look through a first end of the housing 202, through the one-way mirror 302, and through the second end of the scope 108, and see a target located distal from the second end 108 of the sighting device 104. In one embodiment, the one-way mirror 302 may reflect the image of the target and allow the lens 404 to receive the image through the channel 204 and see the same target as the user. In this manner, in some embodiments, the lens 404 of the visual recording device 402 and the user may see the same target simultaneously through the sighting device 104 without the visual recording device 402 blocking the view of the sighting device 104 from the user. As depicted in FIG. 5, in some embodiments, the visual recording device 402 may include a device disposed in a parallel position to the sighting device 104.

In one embodiment, the lens 404 of the visual recording device 402 may receive an image through the channel 204 and may record the image. For example, in one embodiment, the visual recording device 402 may take a picture or record a video of one or more images that the lens 404 may receive. In a further embodiment, taking a picture or activating/deactivating video recording on the phone 402 may include the user pressing a button on the visual recording device 402 or touching a touchscreen of the visual recording device 402. In another embodiment, the visual recording device 402 may connect to an external interface and taking a picture or activating/deactivating video recording may include the user interacting with the external interface.

In some embodiments, the external interface may mount to the apparatus 500, for example, on the housing 202. For example, in one embodiment, the external interface may include a remote with a button and pressing the button may include the phone 402 taking a picture or activating/deactivating video recording. In one embodiment, the external interface connecting to the visual recording device 402 may include a wireless connection, such as BLUETOOTH, near field communication (NFC), Wi-Fi, or another wireless connection. In some embodiments, the external interface connecting to the visual recording device 402 may include a cable connecting the visual recording device 402 to a remote. In one embodiment, the cable may connect to the phone through a universal serial bus (USB) port or some other external port. One of skill in the art will recognize other ways that an external interface may connect with a visual recording device 402.

Figure 6:
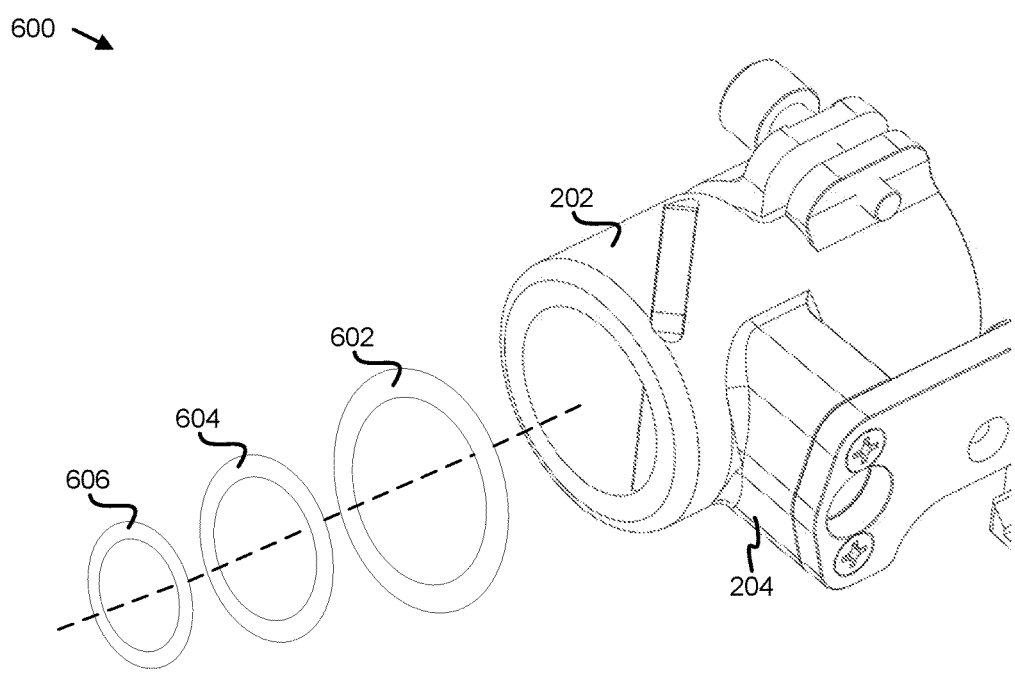
FIG. 6 is a perspective view illustrating an additional embodiment of an apparatus for a phone scope mount.

FIG. 6 is a perspective view depicting one embodiment of an apparatus 600 for a phone scope mount. In one embodiment, the apparatus 600 may include the housing 202 and channel 204 as described above. In one embodiment, the apparatus 600 may include one or more view rings 602, 604, and 606. In some embodiments, the one or more view rings 602, 604, 606 may mount to a first end of the housing 202. The one or more view rings 602, 604, 606, in a further embodiment, may adjust the size of an eyepiece of the first end of the housing 202. In one embodiment, the one or more view rings 602, 604, 606 may prevent a portion of light from entering the first end of the housing 202.

The one or more view rings 602, 604, 606 may mount to a first end of the housing 202 in a variety of ways. For example, in one embodiment, the outer most view ring 602 may include a flange connected to the circumference of the outer most view ring 602. In a further embodiment, the flange may mount over the circumference of the first end of the housing 202 and adjust the size of the eyepiece of the first end of the housing 202. In one embodiment, an inner view ring 604 may include a ring of a diameter such that the inner view 604 ring fits inside the outer most view ring 602, further adjusting the size of the eyepiece of the first end of the housing 202.

In one embodiment, the one or more view rings 602, 604, 606 may include a flexible material. In another embodiment, the one or more view rings 602, 604, 606 may include a rigid material. In one embodiment, the one or more view rings 602, 604, 606 may each include a flange that extends towards a user, further preventing a portion of light from entering the first end of the housing 202.

Although FIG. 6 depicts the apparatus 600 including three view rings 602, 604, and 606, it should not be understood that the apparatus 600 is limited to this embodiment. In one embodiment, the apparatus 600 may include a single view ring 602. In another embodiment, the apparatus may include two or more view rings 602, 604, 606. Furthermore, in some embodiments, the view rings 602, 604, and 606 may include rings of varying width. One of skill in the art will recognize other ways in which the one or more view rings 602. 604, 606 may mount to a first end of the housing 202 and prevent a portion of light from entering the first end of the housing 202.

Figure 7A:
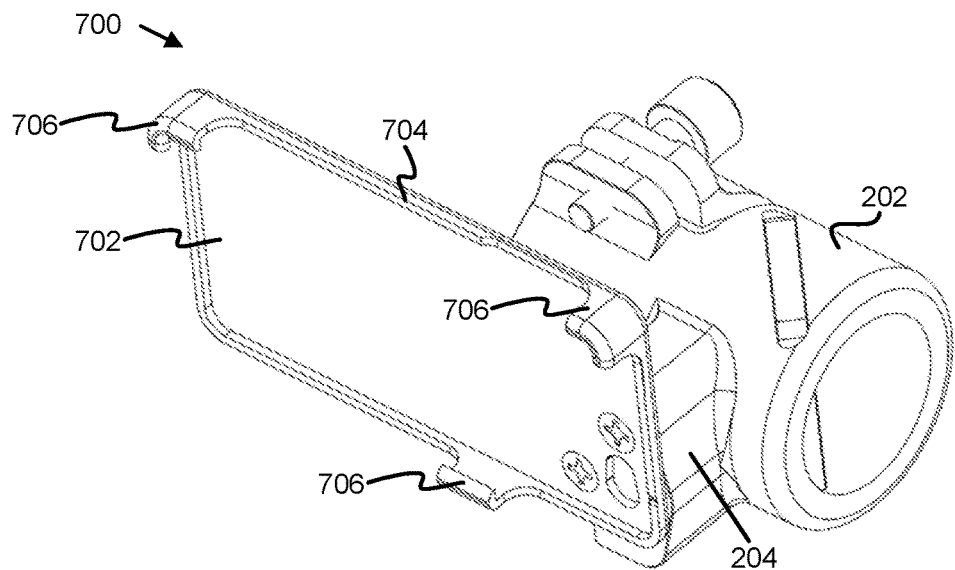
FIG. 7A is a perspective view illustrating one embodiment of a phone scope mount.
Figure 7B:
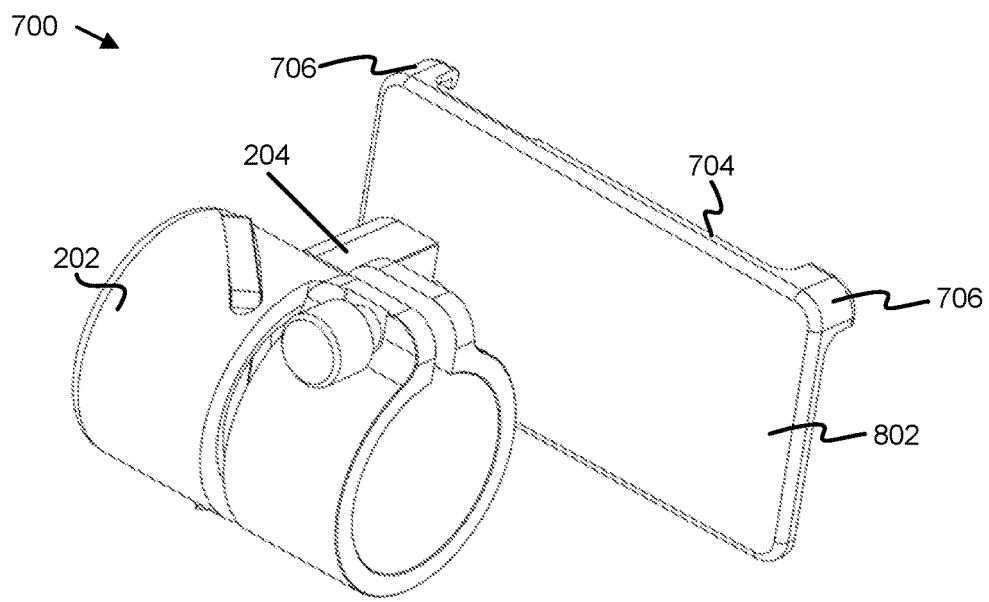
FIG. 7B is a perspective view illustrating a further embodiment of a phone scope mount.

FIGS. 7A and 7B are perspective views showing various embodiments of an apparatus 700 for a phone scope mount. In one embodiment, the apparatus 700 may include a housing 202 and a channel 204 as described above. In a further embodiment, the apparatus 700 may include a sized holder. In one embodiment, the sized holder may include a back plate 702. In one embodiment, the sized holder may include one or more edge protrusions 704. In one embodiment, the sized holder may include one or more edge grips 706.

In one embodiment, one or more components of the sized holder may be sized for a specific type of phone. For example, in one embodiment, the phone holder may be sized to hold an APPLE-brand phone, such as an IPHONE. In another embodiment, the sized holder may be sized to hold a SAMSUNG-brand phone. In one embodiment, the sized holder may be sized for a specific type of photography camera, video recording camera, web camera, or another type of device capable of receiving optical input.

In one embodiment, the sized holder may include a back plate 702. In one embodiment, the back plate 702 may mount to an end of the channel 204. In a further embodiment, the back plate 702 may include an aperture connected to an end of the channel 204. In one embodiment, the location of the aperture connected to the channel 204 may be based, at least in part, by the type of phone, camera, or the like the sized holder is sized for. In one further embodiment, the back plate 702 may be sized for a specific type of phone, camera, or the like. In a further embodiment, the shape of the back plate 702 may be based, at least in part, on the specific type of phone, camera, or the like.

In one embodiment, the back plate 702 may be detachable from the housing 202, the channel 204, or the like. In a further embodiment, a user may detach the back plate 702 and attach a different back plate 702. In one embodiment, the different back plate 702 may be sized for a different type of phone, camera, or the like. In some embodiments, the back plate 702 may attach to the housing 202, channel 204, or the like in various ways. For example, in one embodiment, as depicted in FIGS. 7A and 7B, one or more screws may couple the back plate 702 to housing 202, channel 204, or the like. One of skill in the art will recognize ways in which the back plate 702 may attach to the housing 202, channel 204, or the like.

In one embodiment, the sized holder may include one or more edge protrusions 704. In a further embodiment, the one or more edge protrusions 704 may mount to an edge of the back plate 702. In one embodiment, the one or more edge protrusions 704 may protrude away from the back plate in a toward where a phone, camera, or the like may mount, as depicted in FIG. 7A. In a further embodiment, the one or more edge protrusions 704 may protrude at an angle from the back plate. For example, in one embodiment, the one or more edge protrusions 704 may protrude substantially perpendicular from the back plate. 702. The one or more edge protrusions, in some embodiments, may prevent a phone from sliding, moving, or the like while the phone is mounted to the sized holder.

In one embodiment, the sized holder may include one or more edge grips 706. In a further embodiment, the one or more edge grips 706, in one embodiment, may extend from one or more edges of the back plate 702, one or more edge protrusions 704, or the like. In one embodiment, the one or more edge grips 706 may each include a flange. In a further embodiment, the flange of each edge grip 706 may aid in gripping a phone, camera, or the like. In one embodiment, the one or more edge grips 706 may be disposed on various portions of the back plate 702, edge protrusions 704, or the like. For example, as depicted in FIGS. 7A and 7B, in one embodiment, the one or more edge grips may be disposed on one or more corners of the back plate 702 or one or more edges of the back plate 702.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a first attachment coupler;
   a second attachment coupler;
   a housing detachably coupleable to a sighting device at a first point, by the first attachment coupler, proximate a first end of the sighting device and at a second point, by the second attachment coupler, proximate a second end of the sighting device to position the housing at an end of the sighting device, the housing comprising a channel protruding from a side of the housing between a first end and a second end of the housing and aligned non-parallel to an axis of the sighting device which extends between the first end and the second end of the sighting device;
   a single mirror forming an only mirror in the apparatus, the single mirror comprising a one-way mirror disposed inside the housing, the single mirror positioned to:
      allow an image from the sighting device to pass through the one-way mirror; and
      reflect light forming the image from the sighting device away from the axis and through the channel to an exterior of the housing; and
   a mounting plate coupled to the housing to be adjustably engageable relative to the housing, the mounting plate engageable with a visual recording device.

2. The apparatus of claim 1, wherein the housing further comprises:
   a clamp detachably coupleable to the end of the sighting device; and
   at least one track slidably engageable with a portion of the clamp, wherein the housing slides along the at least one track to adjust a distance from the sighting device.

3. The apparatus of claim 1, wherein the mounting plate further comprises an image stabilizing bar comprising a hook detachably engageable with the sighting device and rotatably coupleable to the mounting plate.

4. The apparatus of claim 1, further comprising a sunshade coupled to the mounting plate.

5. The apparatus of claim 4, wherein the sunshade further comprises a mirror mounted to a surface of the sunshade, wherein the surface is disposed toward a screen of the visual recording device.

6. The apparatus of claim 1, further comprising at least one adjustment bar engageable with the visual recording device and adjustable along at least one axis in X and Y relative to the mounting plate.

7. The apparatus of claim 6, further comprising at least one adjustment mechanism to facilitate adjustment of at least one end of the mounting plate radially relative to the sighting device.

8. The apparatus of claim 6, wherein at least one of the at least one adjustment bar comprises a rotatable stop located distal from the mounting plate, wherein the rotatable stop rotates to allow the visual recording device to disengage from the mounting plate.

9. The apparatus of claim 6, wherein the at least one adjustment bar comprises a micro adjusting screw, wherein the micro adjusting screw adjusts the position of the at least one adjustment bar along at least one axis in X and Y relative to the mounting plate.

10. The apparatus of claim 1, wherein the one-way mirror is disposed inside the housing at a 45-degree angle from an end of the housing.

11. The apparatus of claim 6, wherein the at least one adjustment bar adjusts to fit the visual recording device next to the mounting plate and align a camera lens of the visual recording device with the channel.

12. A system comprising:
   a sighting device having a first end and a second end; and
   an apparatus comprising:
      a first attachment coupler;
      a second attachment coupler;
      a housing detachably coupleable to the sighting device at a first point, by the first attachment coupler, proximate the first end of the sighting device and at a second point, by the second attachment coupler, proximate the second end of the sighting device to position the housing at an end of the sighting device;
      wherein the housing comprises a channel protruding from a side of the housing between a first end and a second end of the housing and aligned non-parallel to an axis of the sighting device which extends between the first end and the second end of the sighting device;
      at least one track coupled to the housing to be parallel to the axis of the sighting device, the at least one track positioned to allow adjustment of a proximity of the housing relative to the sighting device;
      a single mirror forming an only mirror in the apparatus, comprising a one-way mirror disposed inside the housing, the single mirror positioned to:
         allow an image from the sighting device to pass through the one-way mirror; and
         reflect light forming the image from the sighting device, away from the axis, and through the channel to an exterior of the housing; and
      a mounting plate adjustably engageable to the housing and rotatable about the housing, the mounting plate engageable with a visual recording device.

13. The system of claim 12, wherein the visual recording device comprises at least one of:
   a phone;
   a photography camera;
   a video camera; and
   an action camera.

14. The system of claim 12, wherein the housing further comprises:
a clamp detachably coupleable to the end of the sighting device, wherein the at least one track is slidable engageable with a portion of the clamp and the housing is configured to slide along the at least one track.

15. The system of claim 12, wherein the mounting plate further comprises an image stabilizing bar forming an adjustment mechanism to facilitate radial displacement of at least one end of the mounting plate relative to the sighting device, the image stabilizing bar comprising a hook detachably engageable with the sighting device and rotatably coupleable to the mounting plate.

16. The system of claim 12, further comprising a sunshade coupled to the mounting plate.

17. The system of claim 12, further comprising at least one adjustment bar engageable with the visual recording device and adjustable along at least one axis in X and Y relative to the mounting plate.

\* \* \* \* \*